(No Model.) 2 Sheets—Sheet 1.
J. A. MENGEL, G. K. BINKLEY & G. H. GERBER.
SEED PLANTER.
No. 557,136. Patented Mar. 31, 1896.
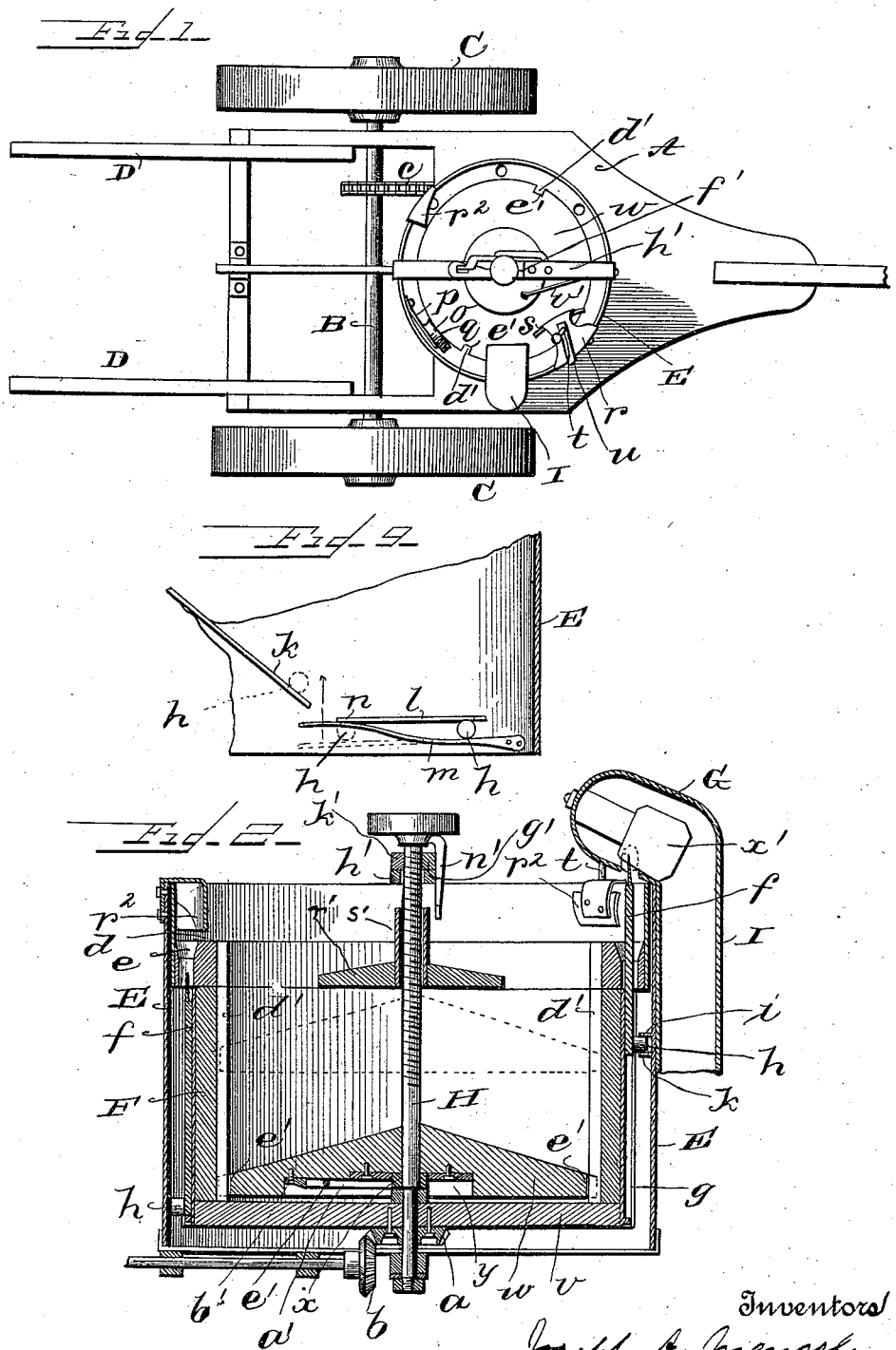

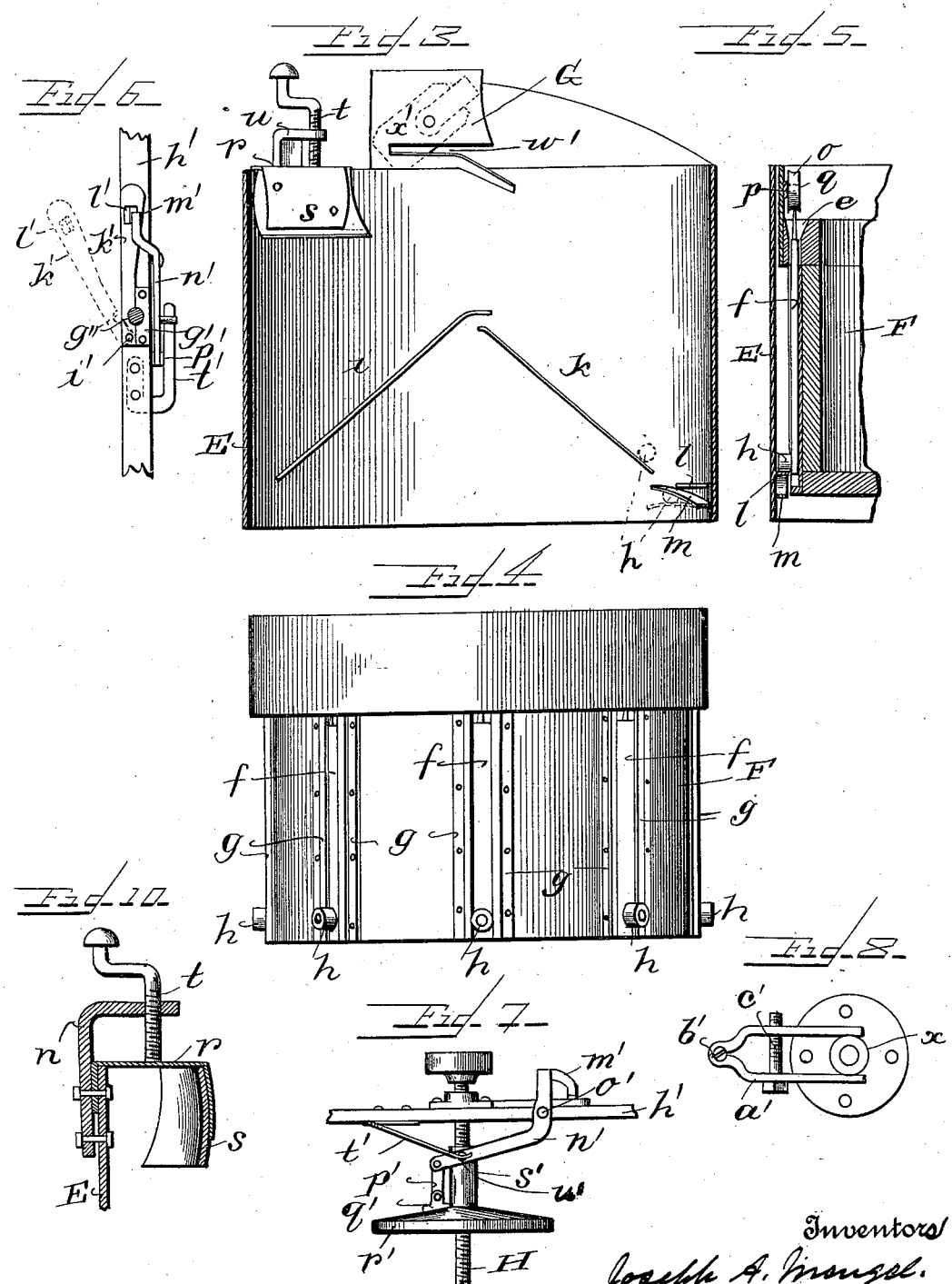

UNITED STATES PATENT OFFICE.

JOSEPH A. MENGEL, OF McKEANSBURG, GEORGE K. BINKLEY, OF ORWIGS-
BURG, AND GEORGE H. GERBER, OF POTTSVILLE, PENNSYLVANIA.

SEED-PLANTER.

SPECIFICATION forming part of Letters Patent No. 557,136, dated March 31, 1896.

Application filed June 6, 1895. Serial No. 551,899. (No model.)

*To all whom it may concern:*

Be it known that we, JOSEPH A. MENGEL, residing at McKeansburg, GEORGE K. BINKLEY, residing at Orwigsburg, and GEORGE H. GERBER, residing at Pottsville, in the county of Schuylkill and State of Pennsylvania, citizens of the United States, have invented certain new and useful Improvements in Seed-Planters; and we do hereby declare the following to be a full, clear, and exact description of the invention, such as will enable others skilled in the art to which it appertains to make and use the same.

Our invention relates to agricultural implements, has especial reference to seed or potato planters, and consists in certain improvements in construction which will be fully disclosed in the following specification and claims.

In the accompanying drawings, which form part of this specification, Figure 1 represents a top plan view; Fig. 2, a vertical section of the casing and the hopper on an enlarged scale; Fig. 3, a like view of the casing; Fig. 4, a side elevation of the hopper detached; Fig. 5, a vertical section showing one of the spears in one of the pockets; Fig. 6, a top plan view of the friction-brake detached; Fig. 7, a side elevation of the same; Fig. 8, an inverted plan of the friction-clamp engaging the rod which raises the bottom of the hopper, as applied to the under side of the said bottom; Fig. 9, a section showing part of the track for operating the spears, and Fig. 10 a detail showing the guide for directing the seed outward toward the wall of the hopper.

Reference being had to the drawings and the letters thereon, A indicates a frame supported upon an axle B and wheels C C and is provided with handles D D, the plow being omitted, as it forms no part of our invention. Upon the frame A is supported the planting mechanism, which comprises an outer casing E, within which is a revoluble hopper F, rotated by gear-wheels $a\ b$, driven from the axle B by a belt $c$ in the usual manner. Within the hopper and near the upper end is formed a ledge $d$, in which are a number of conical pockets $e$ to receive the potatoes, and are designed to hold one seed-potato or one piece of a potato, when cut potatoes are used for seed, and below said ledge and around the outside or periphery of the hopper are spears $f$, supported in guideways $g$ on the outside of the inner cylinder of the hopper, and each spear is provided with a friction-roller $h$, which engages the inclined ways or tracks $i\ k$ on the inside of the casing F to raise and return the spears. When the spears are raised, they pass through the seed-cups and carry one seed or potato with them, which is elevated out of the hopper into a hood G, where the potato is supported while the spear is being withdrawn from the potato. The track or way is provided with a horizontal section $l$, below which is a leaf-spring $m$, and between which section $l$ and the spring $m$ each roller $h$ on the spear travels in the revolution of the hopper, and as the roller passes between said section and spring the spring is depressed, as shown in dotted lines in Fig. 9, and as soon as the roller passes or clears the inner end $n$ of section $l$ the resiliency of the spring $m$ suddenly projects or throws the spear upward into the pocket above it, as shown in Fig. 5.

The potatoes are held in place in the pocket, while the spears are being projected by the spring $m$, by a weight $o$, which is pivotally attached to the casing E by an arm $p$, upon which the weight is revolubly supported by a pin $q$, as shown in Figs. 1 and 5.

In ascending the track $k$ the rollers $h$ engage the upper side of the track and in descending the track $i$ they engage the under side of the track to draw the spears down to their normal position in their guideways $g$ to be ready to engage the section $l$ and spring $m$ when the pocket to which each spear belongs with its potato passes under the weight $o$. The potatoes are guided or directed outward toward the pockets by a vertically-adjustable guide $r$, between the inner surface of whose depending flange $s$ and the wall of the hopper the potatoes pass while they are traveling outward from the center of the hopper toward the ledge $d$ and the pockets $e$, and the guide is adjusted vertically by a screw $t$ supported in an arm $u$ secured to the casing E. The guide $r$ may be made of spring-steel of sufficient resiliency to return to its normal position when the screw $t$ is withdrawn from contact with it, or the screw may be attached to the guide with an ordinary swivel-joint, or a separate spring may be placed under the horizontal arm of the guide to return it. Any excess of potatoes which may have lodged in the pockets $e$ are removed by a spring-guide $r^2$, which is attached to the outer casing and directs the potatoes inward toward the center of the hopper, as shown in Figs. 1 and 2.

The hopper is provided with a fixed bottom $v$, to which the master gear-wheel $a$ is secured, and with a separate and vertically-adjustable bottom $w$, which is automatically raised by means of a screw-threaded rod H to raise the seed in the hopper to supply the pockets $e$. The lower end of the rod is provided with a cylindrical head $x$, which is in a recess $y$ in the under side of the bottom $w$, and in said recess is a friction-clamp $a'$ which is secured to the bottom by a screw $b'$ and engages the head $x$ between the two arms of the clamp, as shown in Figs. 2 and 8, the tension of the clamp being regulated by the transverse bolt $c'$, and the rod is caused to revolve by friction of said clamp in opposition to the rotary motion of the hopper and its bottom $w$, the latter being keyed to the hopper by the vertical guides $d'$ $d'$ on the inside of the hopper, and which guides are engaged by slots $e'$ $e'$ in the periphery of the bottom $w$. The upward motion of the bottom $w$ is arrested by a friction-brake which is composed of the vertically-separated nut $f'$ with which the screw-threads of the rod H engage, and one half or one side, $g'$, of said nut is permanently fixed to the supporting-bar $h'$, and the other half or side, $g^2$, of the nut is pivotally secured to said bar at $i'$ and is provided with an arm $k'$ having a slot $l'$ in its outer end, which is engaged by the finger $m'$ of lever $n'$ fulcrumed at $o'$ on the bar $h'$ and draws the half-nut $g^2$ toward the fixed half-nut $g'$ with sufficient force to hold the rod against rotating under the friction produced by the clamp $a'$. The lower end of the lever $n'$ is attached to a link $p'$, which is connected to a lug $q'$ on the disk $r'$ and the lever $n'$ is connected to a sleeve $s'$ on the rod H, which sleeve is attached to the upper side of the disk $r'$, as shown in Fig. 7.

As the bottom $w$ approaches the upper end of the hopper some of the potatoes lying thereon are brought in contact with the under side of the disk $r'$ and raise it, the bottom being under control of the screw-threaded rod H until the pressure upon the disk communicated to the friction-brake locks the rod against future rotation. The finger $m'$ is then withdrawn from the slot $l'$ and the brake opened, when the bottom $w$ descends by gravity and the spring $t'$, which is secured to the bar $h'$ and engages a stud $u'$ on the sleeve $s'$, pushes the disk $r'$ down to its normal condition. The disk $r'$ is secured against rotation by a rod $v'$, which may be attached to any part of the hopper-casing or to the bar $h'$, as shown in Fig. 1.

The hood G is provided with a slot $w'$, which the spears $f$ enter, bearing a seed or potato, and within said hood is a spring-operated arm $x'$, which pushes the seed or potato into the seed-conductor I as soon as the spear is withdrawn from the potato.

The conductor is shown extending only part way down the side of the casing E, but is extended to the ground in the usual manner in practice.

Having thus fully described our invention, what we claim is—

1. In a seed-planter, a revoluble hopper provided with pockets to receive seed, in combination with vertically-reciprocating spears to engage the seed and a seed-conductor.

2. In a seed-planter, a revoluble hopper provided with pockets to receive seed, in combination with vertically-reciprocating spears, means for projecting the spears into the pockets to engage the seed and a seed-conductor.

3. In a seed-planter, a revoluble hopper provided with pockets to receive seed, in combination with vertically-reciprocating spears, a spring for projecting the spears into the pockets to engage the seed and a seed-conductor.

4. In a seed-planter, a revoluble hopper provided with pockets to receive seed, in combination with vertically-reciprocating spears, means for projecting the spears into the pockets to engage the seed, means for supporting the seed while the spear is being withdrawn and a seed-conductor.

5. In a seed-planter, a revoluble hopper provided with pockets to receive seed, in combination with vertically-reciprocating spears, means for projecting the spears into the pockets to engage the seed, a slotted support for the seed while the spear is being withdrawn and a seed-conductor.

6. In a seed-planter, a revoluble hopper provided with a vertically-adjustable bottom, in combination with means for raising seed from the hopper and a seed-conductor.

7. In a seed-planter, a revoluble hopper provided with a vertically-adjustable bottom, and means for limiting the upward movement of said bottom, in combination with means for raising the seed from the hopper and a seed-conductor.

8. In a seed-planter, a revoluble hopper provided with a vertically-adjustable bottom and a friction-brake for limiting the upward movement of said bottom, in combination with means for raising the seed from the hopper and a seed-conductor.

9. In a seed-planter, a revoluble hopper provided with a vertically-adjustable bottom and a friction-brake operated by said bottom for limiting its upward movement, in combination with means for raising the seed from the hopper and a seed-conductor.

10. In a seed-planter, a revoluble hopper provided with a vertically-adjustable bottom, a disk, a vertically-separated nut and a lever interposed between said disk and nut, in combination with means for raising the seed from the hopper and a seed-conductor.

11. In a seed-planter, a revoluble hopper provided with a vertically-adjustable bottom, a screw-threaded rod connected to said bottom, a nut engaging said rod and a device connected to said nut to limit the upward movement of the bottom, in combination with means for raising the seed from the hopper and a seed-conductor.

12. In a seed-planter, a revoluble hopper provided with a vertically-adjustable bottom, guides in the hopper to prevent rotation of said bottom, a clamp, a screw-threaded rod engaged by the said clamp on the under side of the bottom, a vertically-separated nut having an arm on one side thereof, a disk and a lever connected thereto and engaging the arm of the nut, in combination with means for raising the seed out of the hopper and a seed-conductor.

13. In a seed-planter, a revoluble hopper provided with pockets to receive seed, and a vertically-adjustable bottom, in combination with vertically-reciprocating spears to engage the seed and a seed-conductor.

14. In a seed-planter, a revoluble hopper provided with pockets to receive seed and a vertically-adjustable bottom, in combination with vertically-reciprocating spears to engage the seed, means for projecting and retracting the spears, a support for the seed, and a seed-conductor.

15. In a seed-planter, a revoluble hopper provided with pockets, means for directing the seed outward toward said pockets, means for further directing the seed toward the pockets and removing an excess of seed from the pockets and vertically-reciprocating spears to engage the seed in the pockets and a seed-conductor.

16. In a seed-planter, a revoluble hopper provided with pockets to receive seed, in combination with vertically-reciprocating spears, a device to hold the seed in the pockets while being engaged by the spears and a seed-conductor.

17. In a seed-planter, a revoluble hopper provided with pockets to receive seed, in combination with vertically-reciprocating spears, a vertically-movable weight to hold the seed in the pockets while being engaged by the spears, and a seed-conductor.

18. In a seed-planter, a revoluble hopper provided with pockets to receive the seed, a vertically-adjustable guide for directing the seed outward toward said pockets, an additional guide for further directing the seed toward the pockets and removing an excess of seed therefrom and means for raising the seed from the hopper in combination with a seed-conductor.

In testimony whereof we affix our signatures in presence of two witnesses.

JOSEPH A. MENGEL.
GEORGE K. BINKLEY.
GEORGE H. GERBER.

Witnesses:
ROBERT L. BOCK,
THOS. B. ZULICK.